United States Patent [19]
Bisaga

[11] Patent Number: 5,870,818
[45] Date of Patent: Feb. 16, 1999

[54] METHOD FOR MANUFACTURING A POLE PIECE FOR ELECTROMAGNETIC FRICTION CLUTCH

[75] Inventor: Joseph J. Bisaga, Turnersville, N.J.

[73] Assignee: Dana Corporation, Toledo, Ohio

[21] Appl. No.: 888,423

[22] Filed: Jul. 7, 1997

Related U.S. Application Data

[63] Continuation of Ser. No. 508,578, Jul. 28, 1995, abandoned.

[51] Int. Cl.⁶ .................................................... H01F 41/02
[52] U.S. Cl. ............................................ 29/607; 192/84.3
[58] Field of Search .................................. 29/602.1, 607, 29/880; 192/84.3, 84.31; 264/60, 61; 336/233

[56] References Cited

U.S. PATENT DOCUMENTS

| | | |
|---|---|---|
| 2,860,403 | 11/1958 | Meyer . |
| 3,319,207 | 5/1967 | Davis ........................................ 336/233 |
| 3,333,334 | 8/1967 | Kuliczkowski et al. ............... 29/608 X |
| 3,712,439 | 1/1973 | Schacher et al. . |
| 4,187,939 | 2/1980 | Silvestrini et al. . |
| 4,685,202 | 8/1987 | Booth et al. . |
| 4,891,077 | 1/1990 | Roll et al. . |
| 4,891,619 | 1/1990 | Booth et al. . |
| 5,096,036 | 3/1992 | Booth et al. . |
| 5,125,255 | 6/1992 | Brown et al. . |
| 5,234,655 | 8/1993 | Wiech, Jr. .................................. 264/60 |
| 5,250,921 | 10/1993 | Van Laningham et al. . |
| 5,445,259 | 8/1995 | Nelson . |

*Primary Examiner*—Carl E. Hall
*Attorney, Agent, or Firm*—MacMillan, Sobanski & Todd, LLC

[57] ABSTRACT

A pole piece for use in an electromagnetic friction clutch is formed by initially providing a preform formed from a magnetically permeable material, such as a ferromagnetic powdered material. The preform includes a face having one or more concentric annular channels or other recessed areas formed therein. The preform is oriented such that the face thereof faces upwardly. Then, a body of a non-magnetically permeable material, such as a non-ferromagnetic material, is laid upon the face of the preform so as to cover at least a portion of the annular channels or other recessed area. The preform and the solid body are next inserted within a sintering oven which heats them to a predetermined temperature. The elevated temperature of the oven causes the solid body of the non-magnetically permeable material to melt and flow into the annular channels or other recessed areas. Some of the melted non-magnetically permeable material also infiltrates into the relatively porous preform of the magnetically permeable material. At the same time, the elevated temperature sinters the magnetically permeable material of the preform and bonds the non-magnetically permeable material thereto to form the pole piece. Subsequently, the cooled pole piece can be machined as desired.

15 Claims, 2 Drawing Sheets

METHOD FOR MANUFACTURING A POLE PIECE FOR ELECTROMAGNETIC FRICTION CLUTCH

This Application is a continuation of Ser. No. 08/508,578 filed Jul. 29, 1995.

BACKGROUND OF THE INVENTION

This invention relates in general to electromagnetically actuated friction clutches and in particular to an improved structure for and method of manufacturing a pole piece for use in such an electromagnetic friction clutch.

Clutches are well known devices which are commonly used in machinery to selectively connect a source of rotational power to a rotatably driven mechanism. A basic clutch structure includes an input shaft connected to the source of rotational power, an output shaft connected to the rotatably driven mechanism, and means for selectively connecting the input shaft to the output shaft for concurrent rotation. When the means for selectively connecting is engaged, the input shaft is connected to the output shaft so as to rotatably drive the mechanism. When the means for selectively connecting is disengaged, the input shaft is disconnected from the output shaft, and the mechanism is not rotatably driven. Many different types of clutches are known in the art for accomplishing this general purpose.

In some clutches, the input shaft is connected to an input member which is rotatably driven by the source of rotational power, while the output shaft is connected to an armature. The input member is fixed in a predetermined axial position. The armature, however, is axially movable relative to the input member between an engaged position, wherein it functionally engages the input member, and a disengaged position, wherein it is spaced apart from the input member. The armature is normally maintained in the disengaged position, wherein it does not frictionally engage the input member and, therefore, is not rotatably driven thereby. When moved to the engaged position, however, the armature frictionally engages the input member so as to be rotatably driven thereby. Friction clutches of this general type are well known in the art.

In some friction clutches, an electromagnet is used to cause selective movement of the armature relative to the input member between the engaged and disengaged positions. Electromagnetically actuated friction clutches of this general type operate on the principle that a magnetic field which is created about a component formed from a magnetically permeable material will exert a mechanical force on that component. This mechanical force will urge the component to move to a position of minimum resistance relative to the flow of magnetic flux (lines of force) generated by the magnetic field, usually referred to as a position of minimum reluctance. Thus, in electromagnetically actuated friction clutches, the input member and the armature are both formed from a magnetically permeable material. When the electromagnet is energized, the electromagnetic field generated thereby attracts the armature toward the input member. As a result, the armature is moved from the disengaged position to the engaged position to connect the input shaft to the output shaft, and the driven device is rotatably driven by the source of rotational power.

A typical pole piece for an electromagnetically actuated friction clutch has a generally U-shaped cross section, defining a flat pole face which is separated from the armature by a relative small air gap. Usually, the pole face of the pole piece is divided into one or more pole regions by a non-magnetically permeable material. The separate pole regions causes the magnetic flux to jump back and forth several times across the air gap separating the input member and the armature when the electromagnet is energized. As is well known, this magnetic flux discontinuity structure, or more simply flux break, increases the magnitude of the magnetic attraction between the input member and the armature. In the past, the flux break, has been accomplished by forming slots or recesses in the pole face which define relatively large air gaps between adjacent pole regions of the magnetically permeable material. Although effective to increase the magnetic attraction between the pole piece and the armature, it has been found that the formation of such slots or other recesses in pole face necessitates the removal of material from the pole piece, which weakens the strength thereof. Electromagnetic clutches of this type are often used to selectively transmit relatively high torque loads. Consequently, any weaknesses in the pole piece detract from the torque transmitting capacity of the electromagnetic clutch. Furthermore, because electromagnetic clutches of this type are often used in automotive applications, such as in air conditioner compressor assemblies, they must be relatively simple and inexpensive in construction. Accordingly, it would be desirable to provide an improved structure for a pole piece for an electromagnetic friction clutch which addresses all of these concerns.

SUMMARY OF THE INVENTION

This invention relates to an improved structure for and method of manufacturing a pole piece for use in an electromagnetic friction clutch. To form the pole piece, a preform is initially formed from a magnetically permeable material, such as a ferromagnetic powdered material. The preform includes a face having one or more concentric annular channels or other recessed areas formed therein. The preform is oriented such that the face thereof faces upwardly. Then, a body of a non-magnetically permeable material, such as a non-ferromagnetic material, is laid upon the face of the preform so as to cover at least a portion of the annular channels or other recessed area. The preform and the solid body are next inserted within a sintering oven which heats them to a predetermined temperature. The elevated temperature of the oven causes the solid body of the non-magnetically permeable material to melt and flow into the annular channels or other recessed areas. Some of the melted non-magnetically permeable material also infiltrates into the relatively porous preform of the magnetically permeable material. At the same time, the elevated temperature sinters the magnetically permeable material of the preform and bonds the non-magnetically permeable material thereto to form the pole piece. Subsequently, the cooled pole piece can be machined as desired.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
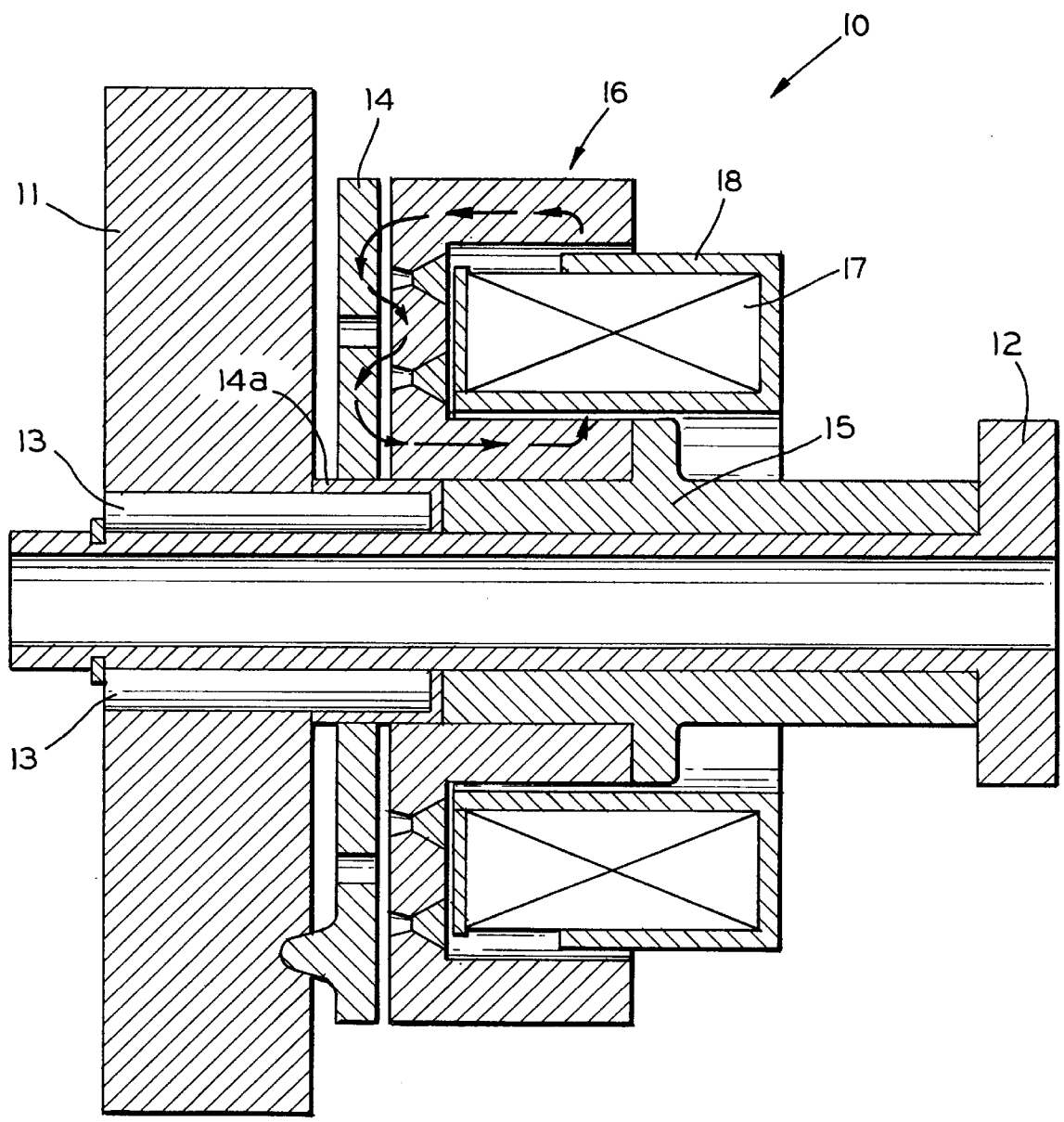
FIG. 1 is a sectional elevational view schematically illustrating an electromagnetic friction clutch including a pole piece in accordance with this invention.

Referring now to the drawings, there is schematically illustrated in FIG. 1 an electromagnetic friction clutch, indicated generally at 10, in accordance with this invention. The basic structure and operation of the clutch 10 are well known in the art. For example, U.S. Pat. No. 4,187,939 to Silvestrini et al., owned by the assignee of this invention, discloses a similar electromagnetic friction clutch. The disclosure of that patent is incorporated herein by reference. Thus, only those portions of the electromagnetic friction clutch 10 which are necessary for a complete understanding of this invention will be discussed.

The electromagnetic friction clutch 10 is adapted to selectively connect a rotatably driven input member, such as an input gear 11, to an output member, such as a hollow cylindrical output shaft 12. The input gear 11 meshes with and is constantly rotatably driven by a source of rotational power (not shown) in any conventional manner. The input gear 11 is rotatably supported on the output shaft 12 by any conventional means, such as by a plurality of needle bearings 13. The electromagnetic friction clutch 10 also includes an armature 14 which is connected to the input gear 11 for rotation therewith and for axial movement relative thereto in a known manner. The armature 14 is also rotatably supported on the output shaft 12 by means of a low friction bearing sleeve 14a. The armature 14 is formed from a magnetically permeable material, such as a ferromagnetic material.

The electromagnetic friction clutch 10 further includes a hollow cylindrical rotor 15 which is secured to the output shaft 12 for rotation therewith. A pole piece, indicated generally at 16, is mounted on the rotor 15 for rotation therewith. Thus, the pole piece 16, the rotor 15, and the output shaft 12 rotate together as a unit. The pole piece 16 is annular and has a generally U-shaped cross section. A coil 17 of an electrical conductor is provided within the pole piece 16 so as to create an electromagnet. The coil 17 is supported in a non-rotatable manner relative to the pole piece 16 by any conventional support structure (not shown). The coil 17 may be contained within a housing 18 within the pole piece 16. The structure of the pole piece 16 will be explained in detail below.

As is well known, the coil 17 functions as an electromagnet when electrical current is passed therethrough. When so energized, the coil 17 generates an electromagnetic field. Magnetic flux flows along the path indicated by the arrows in FIG. 1 from the coil 17 axially in a first direction through the radially outer portion of the pole piece 16 and across an air gap to the armature 14. Then, the magnetic flux flow radially inwardly through the adjacent faces of the armature 14 and the pole piece 16, jumping back and forth several times as shown. Then, the magnetic flux flows axially in a second direction through the armature 14 and across an air gap to the radially inner portion of the pole piece 16 back to the coil 17.

Normally, the armature 14 is maintained in the illustrated disengaged position, wherein it is axially spaced apart from the pole piece 16. In this disengaged position, the armature 14 does not frictionally engage the pole piece 16. As a result, the output shaft 12 is not rotatably driven by the input gear 11. When the coil 17 is energized as described above, the flow of magnetic flux causes the armature 14 to be attracted toward the pole piece 16. If a sufficient amount of electrical current is passed through the coil 17, the armature 14 will move axially to an engaged position, wherein it frictionally engages the pole piece 16. In this engaged position, the armature 14 frictionally engages the pole piece 16 so as to cause the output shaft 12 to be rotatably driven by the input gear 11.

Figure 2:
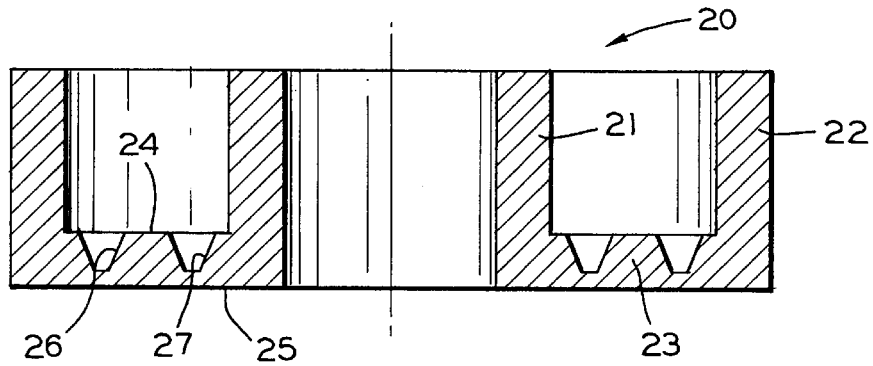
FIGS. 2 through 5 are enlarged sectional elevational views illustrating the steps involved in a method of forming the pole piece illustrated in FIG. 1.

FIGS. 2 through 5 illustrate the process of forming the pole piece 16 discussed above. Referring first to FIG. 2, there is illustrated a preform, indicated generally at 20, which is formed from a magnetically permeable material. Preferably, the preform 20 is formed from ferromagnetic powder which has been pressed together to form a relatively porous rigid article. Ferromagnetic metals exhibit high magnetic permeability, have the ability to acquire high magnetization in relatively weak magnetic fields, and exhibit magnetic hysteresis, among other characteristics. Preferred ferromagnetic metals used to make the ferromagnetic member are selected from the group consisting of steel, iron, cobalt, nickel, and alloys thereof. Most preferred is iron, such as is commercially available from Hoeganaes Corporation of Riverton, N.J. under the designation 45P iron powder.

As shown in FIG. 2, the preform 20 is annular in shape, having a generally U-shaped cross section defined by an axially extending inner ring 21, an axially extending outer ring 22, and a radially extending central portion 23 therebetween. The central portion 23 defines an interior axially facing surface 24 and an exterior axially facing surface 25. The preform 20 can be formed using standard powered metallurgy techniques, typically by compressing a quantity of powered ferromagnetic metal in a mold at a pressure between about thirty-five tons per square inch and forty tons per square inch. The preform 20 is preferably molded to produce a near net shape article, as shown in FIG. 2.

One or more recessed areas are formed in the interior surface 24 of the preform 20. In the illustrated embodiment, a pair of annular concentric channels 26 and 27 are formed in the interior surface 24 of the preform 20. However, the recessed areas can be formed having any desired shape. The channels 26 and 27 are preferably formed during the above-described molding process for the preform 20. However, the channels 26 and 27 can alternatively be formed by a stamping or machining operating performed on the preform 20 after being molded as described above.

Figure 3:
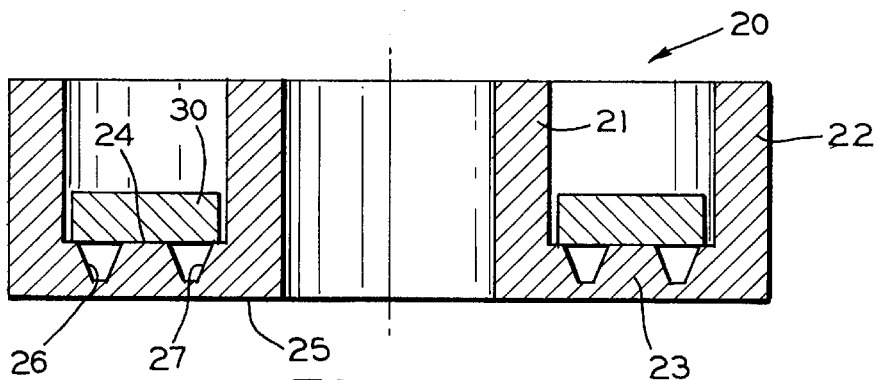

Referring now to FIG. 3, the second step of the method of forming the pole piece 16 involves disposing a body 30 of a non-magnetically permeable material adjacent to the interior surface 24 of the preform 20, extending over portions of the annular channels 26 and 27 or other recessed areas. In the illustrated embodiment, the body 30 is a flat ring of non-ferromagnetic material. The body 30 may, for example, be formed from brass, aluminum, copper, tin, and alloys thereof. It has been found to be desirable to form the body 30 from an alloy of about 90% copper and about 10% tin. As shown in FIG. 3, the body 30 is placed on top of the interior surface 24 of the preform 20 so as to extend over the annular channels 26 and 27.

The third step of the method of forming the pole piece 16 involves heating the preform 20 and the body 30 to a predetermined temperature. Preferably, this is accomplished in a sintering oven. The temperature and duration of this heating for the preform 20 and the body 30 will vary with the specific materials used and upon the size of the pole piece 16 to be formed. Using the above discussed preferred materials, however, it has been found acceptable to subject the preform 20 and the body 30 to a temperature about 1123° C. to about 1130° C. for a period of time ranging from about fifteen to about twenty minutes. Such heating causes the body 30 to melt, as shown at 31 in FIG. 4, and flow into the annular channels 26 and 27. Because of the interconnected pores in the powered ferromagnetic metal which forms the preform 20, capillary action also causes the molten non-ferromagnetic material of the body 30 to infiltrate throughout portions of the preform 20. This infiltration increases the bond strength between the two materials and, thus, the resultant strength of the finished pole piece 16.

Figure 4:
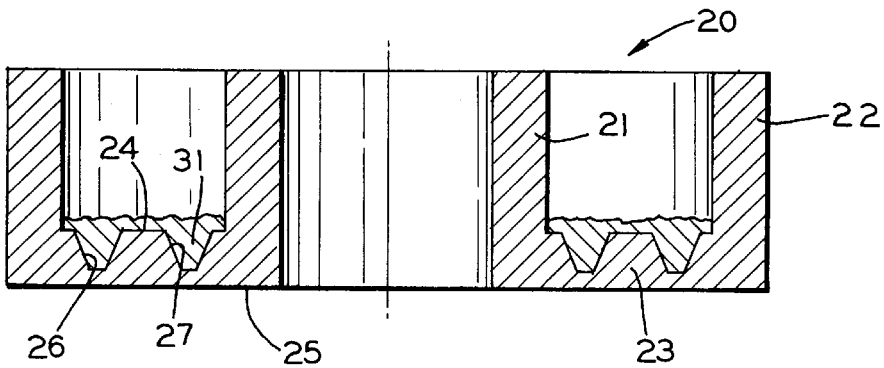

The non-ferromagnetic material of the melted body 31 should at least partially fill the channels 26 and 27 or other recessed areas formed in the preform 20. More preferably, as shown in FIG. 4, the non-ferromagnetic material of the melted body 31 completely fills the channels 26 and 27. The elevated temperature sinters the magnetically permeable material preform 20 and bonds the non-magnetically permeable material of the melted body 30 thereto. In this preferred method, therefore, the melting point of the non-ferromagnetic material of the body 30 is lower than the sintering temperature of the ferromagnetic member. As a less preferred alternative to the above step of melting the non-ferromagnetic material of the body 30 after it has been placed upon the ferromagnetic preform 20, the non-ferromagnetic material could be melted separately from the preform 20, then subsequently poured on top of the interior surface 24 of the ferromagnetic preform 20.

Figure 5:
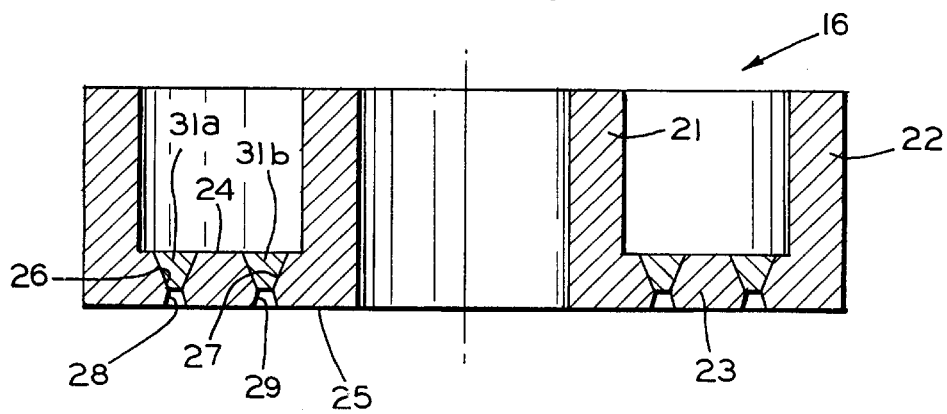

Referring now to FIG. 5, the fourth step of the method of forming the pole piece 16 involves machining the exterior surface 25 of the central portion 23 of the sintered preform 20 to remove ferromagnetic metal in the region adjacent to the annular channels 26 and 27. Preferably, this machining removes all of the ferromagnetic metal opposite the annular channels 26 and 27 so as to form annular concentric grooves 28 and 29, respectively. The annular channels 26 and 27 are thus filled with respective portions 31a and 31b of the non-ferromagnetic material of the melted body 31, while the respective grooves 28 and 29 provide an interruption between adjacent portions of the sintered ferromagnetic material of the preform 20. Removal of all the ferromagnetic material in this manner creates a pair of magnetic flux breaks within the pole piece 16. As a result, the pole piece 16 can be installed within the electromagnetic friction clutch 10 and operated as discussed above.

At the same time, a machining process can be performed on the interior surface 24 of the preform 20. This machining can be performed to remove any excess non-ferromagnetic material from the melted body 31 and to smooth the interior surface 24, allowing the coil 17 of the electromagnet discussed above to fit closely therein.

In accordance with the provisions of the patent statutes, the principle and mode of operation of this invention have been explained and illustrated in its preferred embodiment. However, it will be understood that this invention may be practiced otherwise than as specifically explained and illustrated without departing from its spirit or scope.

What is claimed is:

1. A method of manufacturing a pole piece for use in a magnetic circuit comprising the steps of:

(a) providing a preform formed from a porous magnetically permeable material, the preform including inner and outer rings that are connected together by a central portion, the central portion including an inner surface and an outer surface, the inner surface of the central portion having a channel formed therein;

(b) disposing a body formed from a non-magnetically permeable material adjacent the inner surface of the preform;

(c) heating the preform and the body to cause the body to melt and thereby flow into the channel formed in the inner surface of the preform and to cause portions of the body to infiltrate the inner surface of the porous preform, further heating the infiltrated preform and the body to sinter the preform, and cooling the sintered preform and the body to bond the body to the preform; and (d) removing a portion of the outer surface of the central portion of the preform only opposite the channel so as to form a magnetic flux break between adjacent regions of the magnetically permeable material of the preform.

2. The method defined in claim 1 wherein said step (a) is performed by compressing a quantity of powdered magnetically permeable material to provide the preform.

3. The method defined in claim 2 wherein said step (a) is performed by forming the channel in the inner surface of the central portion at the same time the quantity of powdered magnetically permeable material is compressed.

4. The method defined in claim 2 wherein said step (a) is performed by forming the channel in the inner surface of the central portion after the quantity of powdered magnetically permeable material is compressed.

5. The method defined in claim 4 wherein the channel is formed in the inner surface of the central portion by stamping.

6. The method defined in claim 4 wherein the channel is formed in the inner surface of the central portion by machining.

7. The method defined in claim 2 wherein said step (e) is performed by forming a groove in the outer surface of the central portion of the preform only opposite the channel.

8. The method defined in claim 7 wherein the channel defines a cross sectional width, and wherein the groove has a cross sectional width that is approximately the same as the cross sectional width of the channel.

9. The method defined in claim 2 wherein said step (a) is performed by providing a plurality of channels in the inner surface of the central portion.

10. The method defined in claim 9 wherein said step (a) is performed by forming each of the channels in the inner surface of the central portion at the same time the quantity of powdered magnetically permeable material is compressed.

11. The method defined in claim 9 wherein said step (a) is performed by forming each of the channels in the inner surface of the central portion after the quantity of powdered magnetically permeable material is compressed.

12. The method defined in claim 11 wherein each of the channels is formed in the inner surface of the central portion by stamping.

13. The method defined in claim 11 wherein each of the channels is formed in the inner surface of the central portion by machining.

14. The method defined in claim 9 wherein said step (e) is performed by forming a groove in the outer surface of the central portion of the preform only opposite each of the channels.

15. The method defined in claim 14 wherein each of the channels defines a cross sectional width, and wherein each of the grooves has a cross sectional width that is approximately the same as the cross sectional width of the channel opposite therefrom.

* * * * *